United States Patent [19]

Hirashima

[11] Patent Number: 5,768,518

[45] Date of Patent: Jun. 16, 1998

[54] SIGNAL DISTRIBUTION APPARATUS FOR A DIRECTIONAL SIGNAL TRANSMISSION SYSTEM

[75] Inventor: Masayoshi Hirashima, Ibaraki, Japan

[73] Assignee: Matsushita Electric Industrial Co., Ltd., Osaka, Japan

[21] Appl. No.: 535,746

[22] Filed: Sep. 28, 1995

[30] Foreign Application Priority Data

Sep. 30, 1994 [JP] Japan ................................. 6-236727
Oct. 24, 1994 [JP] Japan ................................. 6-258222

[51] Int. Cl.$^6$ .............................. H01J 13/00; H04N 7/14; H04H 1/00

[52] U.S. Cl. .............................. 395/200.49; 348/7; 348/12; 435/4.2; 435/5.1

[58] Field of Search .............................. 348/6, 7, 12, 13; 455/3.1, 4.1, 4.2, 5.1; 395/200.49, 48, 49; H04N 7/10, 7/14

[56] References Cited

U.S. PATENT DOCUMENTS

| | | | |
|---|---|---|---|
| 5,262,875 | 11/1993 | Mincer et al. | 358/335 |
| 5,473,362 | 12/1995 | Fitzgerald et al. | 348/7 |
| 5,553,005 | 9/1996 | Voeten et al. | 364/514 R |
| 5,586,264 | 12/1996 | Belknap et al. | 395/200.08 |
| 5,594,924 | 1/1997 | Ottesen et al. | 395/851 |
| 5,606,359 | 2/1997 | Youden et al. | 348/7 |
| 5,610,841 | 3/1997 | Tanaka et al. | 364/514 R |
| 5,640,194 | 6/1997 | Suzuki et al. | 348/7 |

OTHER PUBLICATIONS

W.D. Sincoskie, "Video On Demand: Is It Feasible", *IEEE* 1990, Bell Communications Research.

M. Asai et al., "Study of High-performance Dis-Access-Control Method for Video on Demand Server", Technical Report of IEICE, IE94-13 (1994-5).

*Primary Examiner*—Mark R. Powell
*Assistant Examiner*—John W. Miller
*Attorney, Agent, or Firm*—Ratner & Prestia

[57] ABSTRACT

A time serial signal from a signal source is input into a delay circuit, and the signal is read out from arbitrary intermediate taps of the delay circuit to obtain a specific delayed signal. Alternatively, a time serial signal from a signal source is allotted to a plurality of memory circuits, and the allotted signal contents are read at a specific moment to obtain a specific delayed signal. By distributing the delayed signals in this manner, a signal distribution apparatus can send a serial signal, from its beginning with little delay, to multiple terminals requesting the signal at arbitrary times.

21 Claims, 16 Drawing Sheets

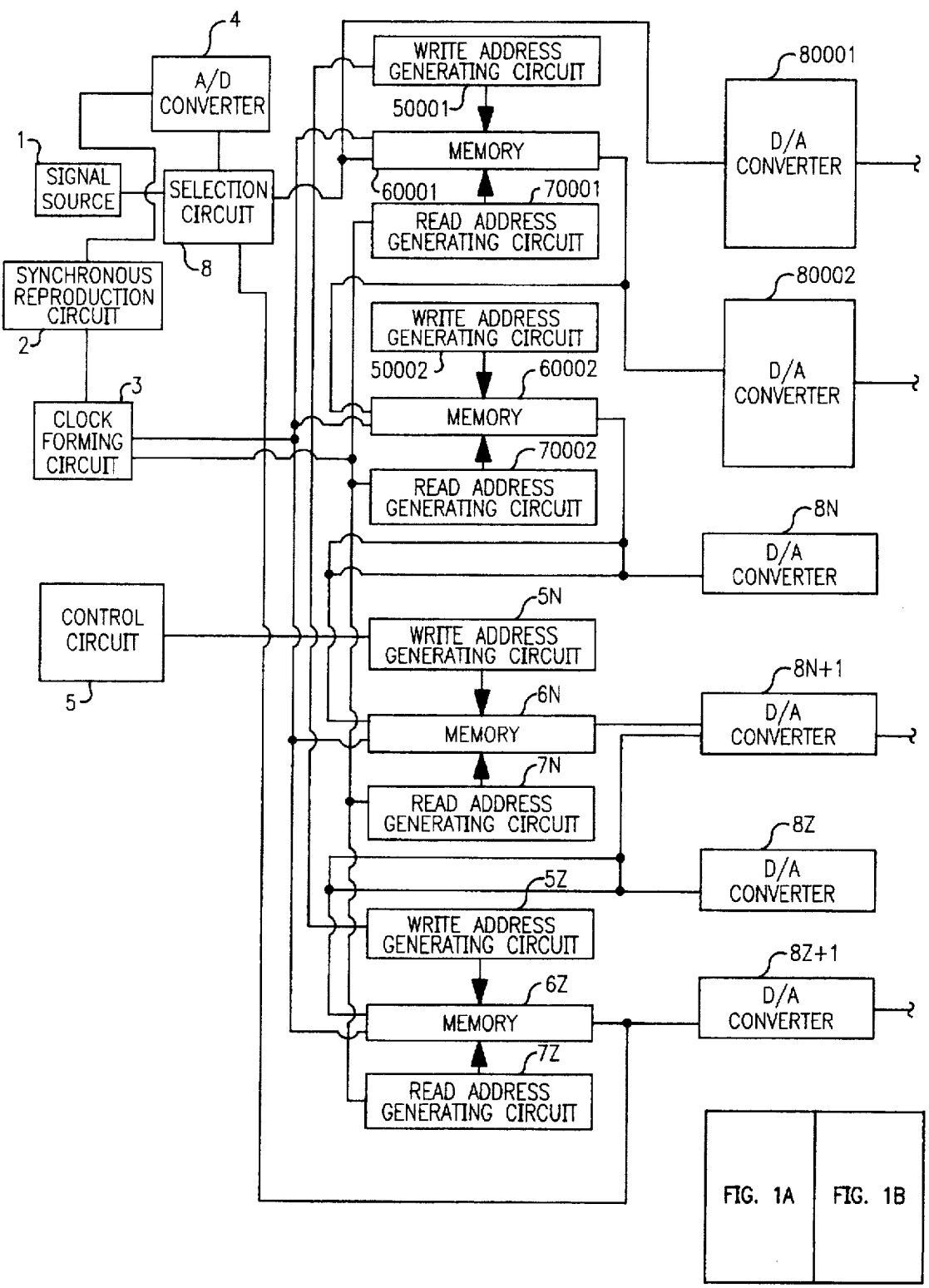
FIG. IA  FIG. I

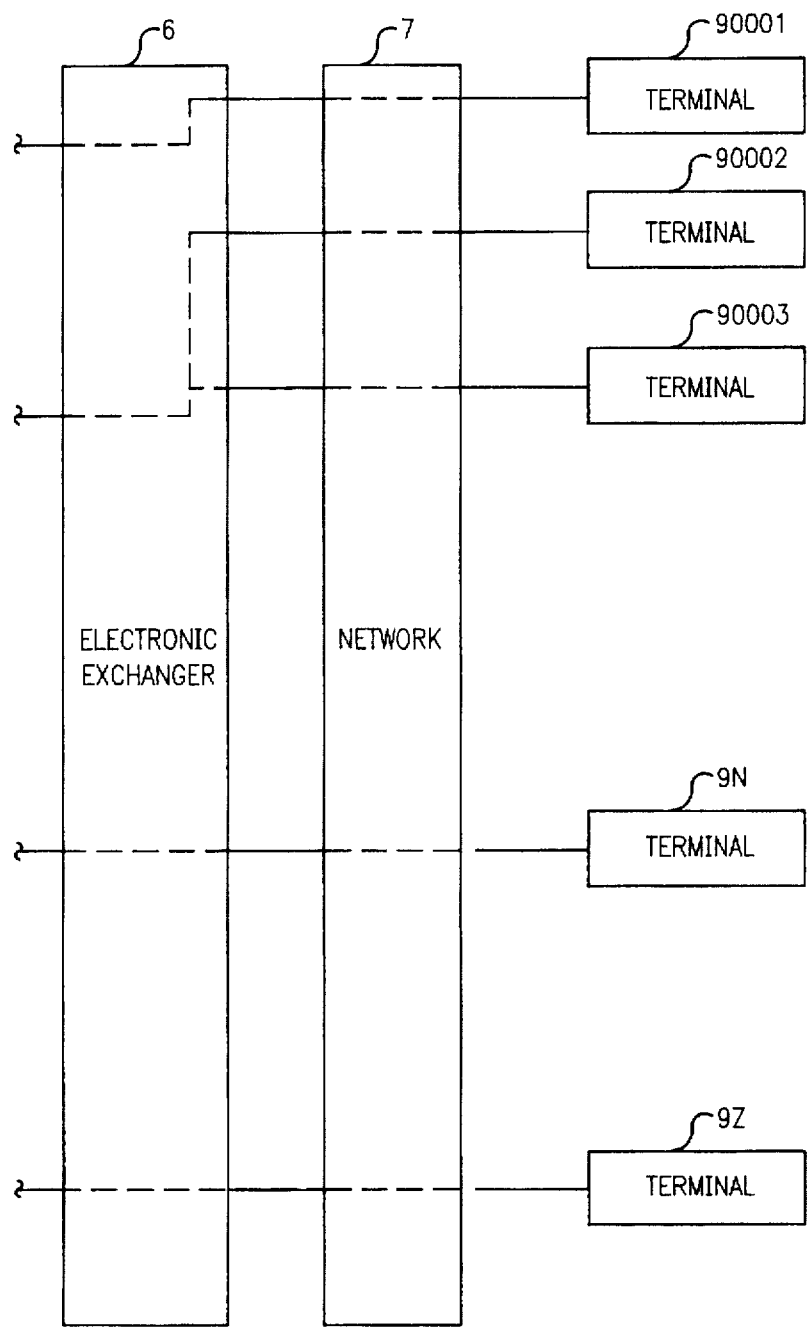
FIG. IB

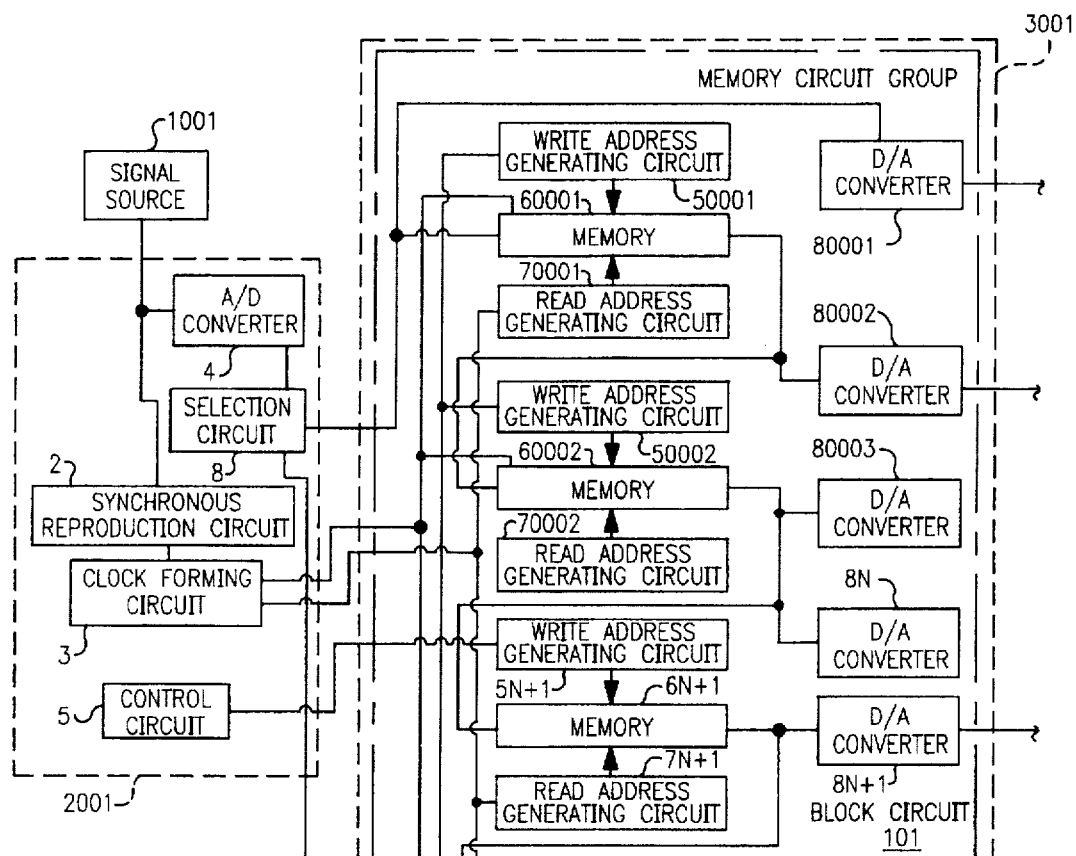
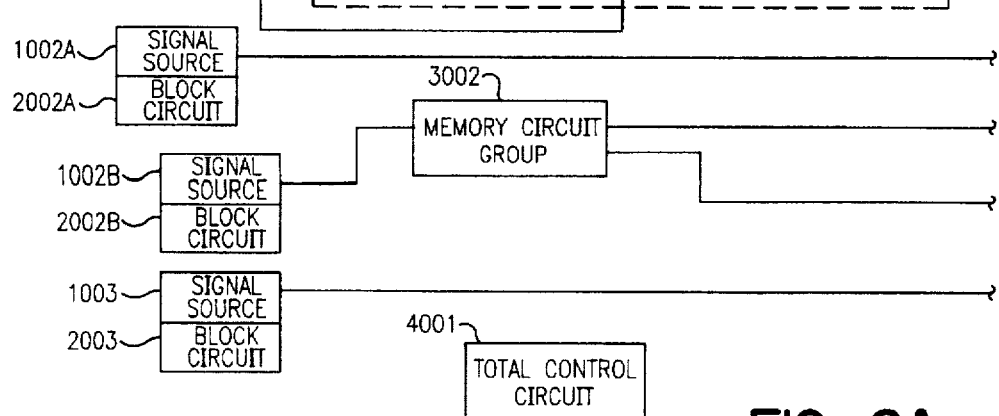
FIG. 6
FIG. 6A

SIGNAL DISTRIBUTION APPARATUS FOR A DIRECTIONAL SIGNAL TRANSMISSION SYSTEM

BACKGROUND OF THE INVENTION

The present invention relates to a signal distribution apparatus in the center of a bi-directional signal transmission system such as a CATV network. The signal distribution apparatus is used for transmitting arbitrary information (mainly movies) at an arbitrary time to a plurality of terminals according to the requests from the terminals (subscribers).

Recently, transmissions of video/audio signals called Video on Demand (hereafter, VOD) have been carried out on a trial basis. This may be a future style of CATV. Movies (there may be shopping information such as catalogs, and other information such as games, but hereafter, movies will be illustrated) which are different for every terminal are output at different times according to the requests of subscribers. Subscribers can watch any movie at any time they want by CATV. A conventional example of the VOD portion of a CATV center is shown in FIG. 11. In FIG. 11, 1A, 1B, and 1C, are the laser disks in which the same movie is recorded. If there are send requests from subscribers 90001, 90002, and 90003 at one second intervals, the same movie signals can be supplied from the three signal sources to the three terminals at different times respectively as shown in FIG. 11. In this case, if there are send requests from a plurality of terminals at different times, the same number of signal sources, that is, laser disks, have to be prepared. A signal source N1 in FIG. 11 is a hard disk having a plurality of read-out heads.

The capacity which is necessary for storing digitized NTSC video signals is calculated as follows. When the sampling frequency is four times that of the color subscriber, namely, 3.579545×4=14.31818 MHz, since one line has 910 samples, one frame has 525 lines, so one frame of data in 8-bit quantization is:

8×910×525=3822000 bits ? 3.8 M bits. At 30 frames per second, the data quantity in one minute is: 60×30×3.8=6840 M bits ? 6.9 G bits ? 0.86 G bytes. The data quantity in an hour is

*60×0.86 G=51.6 G bytes*

Since the maximum capacity of available hard disks is about 11 G bytes, a one hour movie can be stored in five hard disks. A two hour movie can be stored in ten hard disks.

If band reduction known as MPEG2 is used, the data quantity may be reduced to less than one tenth without deterioration of the image quality. Thus, a two hour movie can be stored in one 11 G byte hard disk using band reduction. Accordingly, available hard disks can store a movie of two hours or more.

However, the number of read out heads in the hard disk cannot be increased infinitely. So, the hard disk cannot accommodate the case in which the N1 signal in FIG. 11 is requested from N1 terminals at time T1, from N2 terminals at time T2, and from N3 terminals at time T3. Generally, a plurality of the same signal sources are provided and a trial of the system is performed, assuming that there is little chance that the system will receive concentrated send requests for a specific movie with scattered timings. But, in actually, there is a high enough probability of such an occurrence. Accordingly, a system as shown in FIG. 11 cannot correspond to various send requests from many terminals.

In the journal of the television society, vol. 48 No. 3, p 287–294, it is shown that signals can be read from the same hard disk at ten different times through the processing of information to read for 0.1 sec from the magnetic disk. But at 20 reads per second, each read has to be done for 0.05 sec. To increase the number of reads per second, the movement of the magnet disk (head) has to be increasingly quick, but there is the limit. The capacity of hard disk has been increasing, and hard disks of 50 G bytes, 100 G bytes may be used in near future.

SUMMARY OF THE INVENTION

In conventional methods, when the same movie is requested from many terminals at different timings, a plurality of signal sources had to be prepared. As the number of subscriber's terminals increases, the number of the same signal sources (movie and the like) has to be increased. Since a signal source is made up of a device and a |recording medium, it is not economical to prepare a plurality of both. An object of the present invention is thus to provide a signal distribution apparatus which is economical, simple, and capable of corresponding to the requests for a movie from many terminals at different times.

To solve the problems described above, the invention provides a signal distribution apparatus which comprises: a first signal source for generating a time serial signal which has contents that change with time; a plurality of unit memory circuits for storing the output of the first signal source by serially allotting intervals of a fixed time length of the output of the first signal source to each of the plurality of unit memory circuits; a second signal source formed by connecting said plurality of unit memory circuits; and, an electronic exchanger for transmitting the output of an arbitrary unit memory circuit to a plurality of terminal receivers; wherein the time serial signal is read from the second signal source by the electronic exchanger and distributed to said terminals.

Moreover, a signal distribution apparatus of the present invention includes one of a memory circuit group A composed of a plurality of unit memory circuits serially connected, and the contents of an arbitrary unit memory circuit in the memory circuit group A is selectively output by an electronic exchanger, and serial signals with a desired delay are sent to a plurality of terminal receivers or a circuit A composed of a plurality of unit memory circuits connected in parallel, the outputs of arbitrary unit memory circuits which have desired delays are successively sent to a plurality of terminal receivers by an electronic exchanger.

The output of a signal source is input to a delay circuit, and a desired delayed signal is obtained by locating an arbitrary intermediate tap. Alternatively, the output of a signal source is divided and allotted to a plurality of memory circuits. A desired signal can be also obtained by starting the reading at desired time and reading the allotted memories in order. The signal delayed in this manner is distributed to terminals by an electronic exchanger, so the time serial signal can be sent from the beginning with little delay between request and receipt. The number of delay circuits can be less than the number of signal sources.

When a delay signal reading device (intermediate tap of the delay provided at each of the levels of the delay device can read out a signal at one second intervals for example and the fan-out of each of the reading devices is large enough, a signal picked up from an intermediate tap of the delay can be sent to a plurality of terminals at the same time and at every one second by an electronic exchanger.

3

BRIEF DESCRIPTION OF THE DRAWINGS

FIG. 1 is a block diagram showing a signal distribution apparatus of a first embodiment of the invention.

DETAILED DESCRIPTION OF THE INVENTION

EMBODIMENT 1

Figure 2:
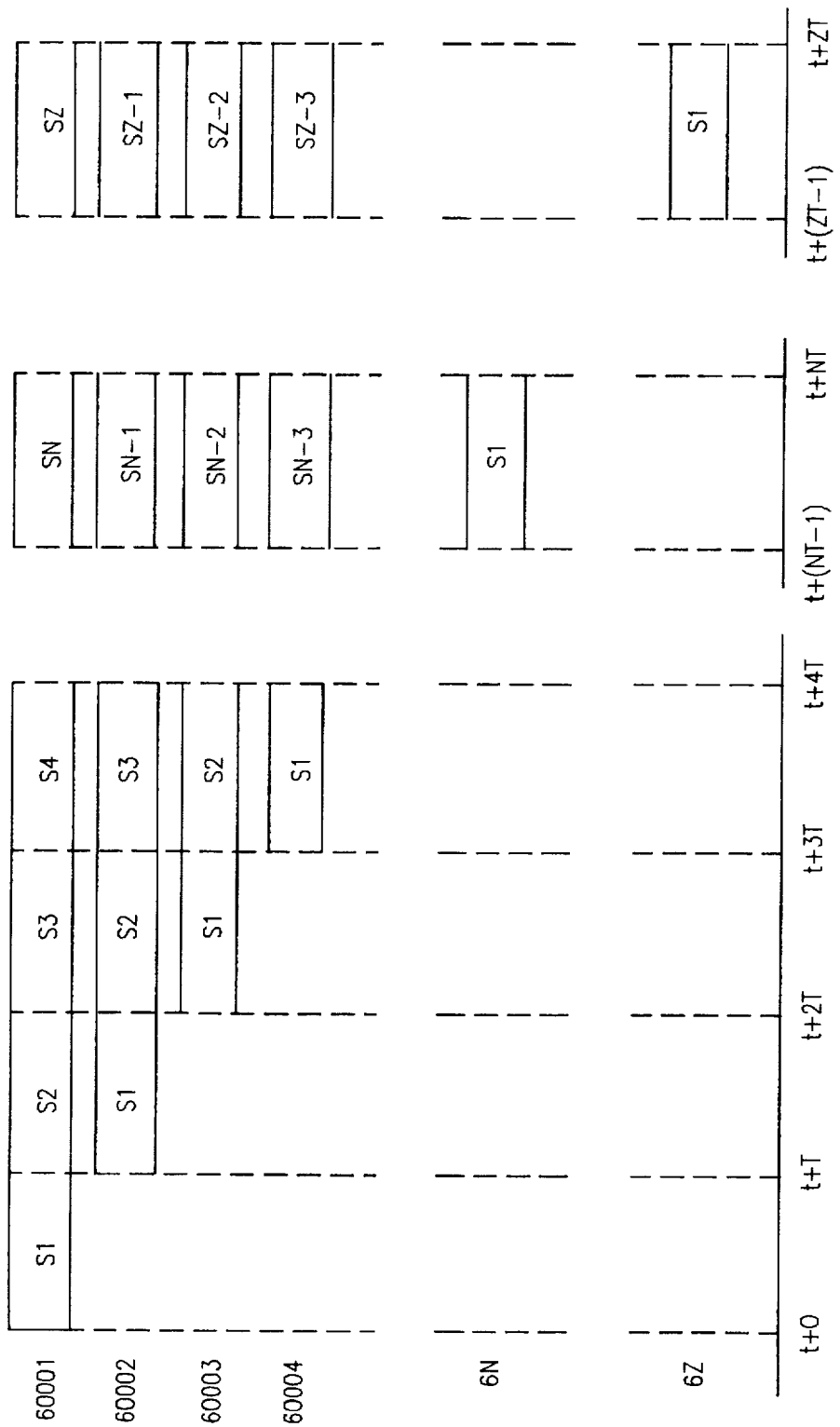
FIG. 2 is a time chart showing the change of the signal with time (way of transferring the signal) in the apparatus.

A first embodiment of the invention will be described with reference to the drawings. FIG. 1 is a block diagram of a signal delay distribution apparatus of a first embodiment of the invention. Of course it is needless to say that there are other embodiments of the invention. The operation of the invention is described below with reference to FIG. 1.

In FIG. 1, numeral 1 is a signal source, which is reproduced from a laser disk recording of a one hour movie. Namely, the signal source 1 is a laser disk player and its output signal includes video and sound signals in the NTSC standard. Only a video signal is shown in the drawings. It is clear that a sound signal is more easily processed than a video signal since the sound signal has less information therein.

Numeral 2 is a synchronous reproduction circuit for reproducing the synchronous signal and a color subcarrier from a color burst signal which is a synchronous signal in the video output signal of the signal source 1 and for generating a signal whose frequency is four times that of the color subcarrier (hereafter 4-fsc).

Numeral 3 is a clock forming circuit for forming a sampling clock for quantizing a video signal into 8-bits from the 4-fsc signal in the output of the synchronous reproduction circuit 2 and then forming a clock signal and other various kinds of control signals for controlling a memory described later. Numeral 4 is an A/D converter for converting the video signal of the signal source 1 into an 8-bit digital signal. The sampling signal of the A/D converter 4 is the 4-fsc signal. The 8-bit output of the A/D converter 4 is serially fed to memories 60001, 60002, . . . , and 6Z. Numeral 8 is a selection circuit for selecting either the output of the A/D converter 4 or the output of the memory 6Z. The selected output is fed to the memory 60001 and A/D converter 80001.

Numerals 60001, 60002, . . . , 6N . . . 6Z are memories for storing a video signal of one second length respectively. Numeral 50001 is a write address generating circuit for writing a signal to the memory 60001. Numeral 70001 is a read address generating circuit for reading a signal from the memory 60001. Numerals 50002, . . . , 5N . . . 5Z are write address generating circuits for writing a signal to the memories. Numerals 70002, . . . , TN . . . 7Z are read address generating circuits for reading a signal from the memories 60002, . . . , 6N . . . 6Z, respectively.

Numeral 80001 is a D/A converter for converting the 8-bit output of the selection circuit 8 to an analog signal. Numerals 80002, . . . , 8N+1 . . . 8Z+1 are D/A converters for converting the 8-bit output of the memories 60001, . . . , 6N . . . 6Z, respectively, to an analog signal.

Numeral 6 is an electronic exchanger. That is, it has the function of connecting Z D/A converters and Z terminals 90001 . . . 9Z (subscribers) into one to one pairs and connecting an arbitrary D/A converter and a plurality of terminals. This can be realized by adding some functions to electronic exchangers used in ordinary telephone lines. Numeral 7 is a network. The invention can be applied to ordinary analog telephone lines if the distance is short. NTSC video and sound signals have been trially transmitted using telephone lines in The United States. The present invention uses cable (CATV) in network 7. Accordingly, the video signal can be sent, without modulation, over a short distance. For long distance transmission of the video signal of a base band, it is converted to VHF band and send by the same signal distribution method as in ordinary CATV. The network 7 may include a modulation and demodulation apparatus for this purpose.

The operation of the system shown in FIG. 1 will now be described with reference to FIG. 2.

When there is a send request from a subscriber (terminal 90001) at time t, reproduction at the laser disk of the signal source 1 starts at the time t. The delay between the request and the start of the reproduction is not relevant to the invention, and this delay is omitted to simplify the description of the invention. A first one second video signal is stored in memory 60001. At the same time, the signal is sent from D/A converter 80001 to terminal 90001, so the video signal output from signal source 1 is transmitted to terminal 90001 from the time t. From time t+1 seconds to t+2 seconds, the first one second signal of the output signal of the signal source 1 is read from memory 60001, and stored into memory 60002. At the same time, the output signal from signal source 1 is transmitted to terminal 90001 through D/A converter 80001. Accordingly, when only one terminal requests a signal, a signal distribution apparatus of the invention is not necessary. The first one sec signal is read from a memory every sec and stored into the next memory, and written in memory 6Z in FIG. 1 between 59 minutes 59 seconds and 60 minutes. FIG. 2 shows the signal movement in the memories at this time. In FIG. 2, memory time of memories 60001, 60002 . . . , 6z is T seconds though when T=1, it coincides with above illustration. Reading the recorded contents from the memory 60001, 60002, . . . , and writing signals to the memory 60001, 60002, . . . , can be performed at the same time. In addition, writing just after reading, which is known as the read modify write method, is used in one memory cell. Accordingly, if only one terminal requests a signal, it is enough for electronic exchanger 6 to connect only D/A converter 80001 and terminal 90001.

Next, consider the case where the same signal (movie) requested from the terminal 90001 is requested from two other terminals at the identical time. The send request time of the two other terminals is defined as t+01 second.

The video signal between time t+00 seconds and t+01 seconds (the first one second of the output of the signal source 1: S1 in FIG. 2) is stored in the memory 60001, the next one second video signal (S2 in FIG. 2) is read from signal source 1 between time t+01 seconds and t+02 seconds. The read output of memory 60001 is thus transmitted to terminals 90002 and 90003 between time t+01 and time t+02. That is, the same movie as in terminal 90001 but delayed by one second therefrom can be sent to terminals 90002 and 90003. Delaying by one second steps continues and the contents of memory 60001 is transmitted to terminals 90002 and 90003 simultaneously.

A movie signal of 60 minutes is thus sent to the terminals 90002 and 90003 delayed one second from the signal sent to the terminal 90001. The electronic exchanger 6 connects terminals 90002, 90003 and D/A converter 80002. An ordinary exchanger can be easily configured so that the output of the D/A converter can be simultaneously fed to at least two terminals. The same movie can be fed simultaneously to multiple terminals if the number of terminals to be connected increases or can be fed to many terminals at different times.

Assumed that subscriber N (terminal) requests the same signal (movie) as the signal supplied to the terminal 90001 at an arbitrary time t+N (different time from the request time t at terminal 90001). In this example, N is temporarily defined as 28 minutes 11 seconds. The time at which the signal source starts to transmit a first signal is denoted as t, the signal between (t+28 minutes 11 seconds) and (t+28 minutes 12 seconds) of the output of the signal source 1 is fed to the terminal 90001, and the signal between (t+28 minutes 10 seconds) and (t+28 minutes 11 seconds) of the output of the signal source 1 is fed to the terminals 90002, 90003. It is rare case that N is exactly 28 minutes 12 seconds. There may be a delay of n/100 seconds. If n is 50 or less than 50, the signal is transmitted from 28 minutes 12 seconds to terminal N. If n is more than 50, the signal is transmitted from 28 minutes 13 seconds to terminal N.

When n is 50 or less than 50, D/A converter 8N+1 and terminal N are connected. When n is more than 50, DA converter 8N+2 and terminal N are connected. To know in which memory among memory groups 60001–6z the first one second signal of the signal source 1 is written, the time requested from the terminal is referred to a timer provided in the write control circuit 5.

Suppose subscriber Z requests the same signal be sent between 59 minutes 59 seconds and 60 minutes, just as the time subscriber 90001 finishes viewing the one hour movie. That is, at a time that the first one second signal of the signal source 1 is written in memory 6z (end of writing). Accordingly, the output signal of the signal source 1 can be directly fed to terminal 9Z or the output of D/A converter 8Z can be fed to the terminal 9Z. In the strict sense, when the signal send request from terminal Z is before 59 minutes, 59 seconds+50/100, the output of memory 6Z is fed to terminal 9Z through D/A converter 8z+1 or the output of signal source 1 is fed to terminal 9Z through DA converter 80001.

When the signal send request from terminal 9Z is after 59 minutes 59 seconds+51/100, the output of memory 60001 is fed to terminal 9Z through D/A converter 80002 after 60 minutes, 01 seconds, namely after 01 second. This means that the signal of signal source 1 is fed to terminal 9z delayed by just 60 minutes from the signal supplied to terminals 90002, 90003.

By using the invention described above, one signal source can accommodate requests for the same signal from a plurality of terminals at arbitrary times.

EMBODIMENT 2

Figures 3, 3A:
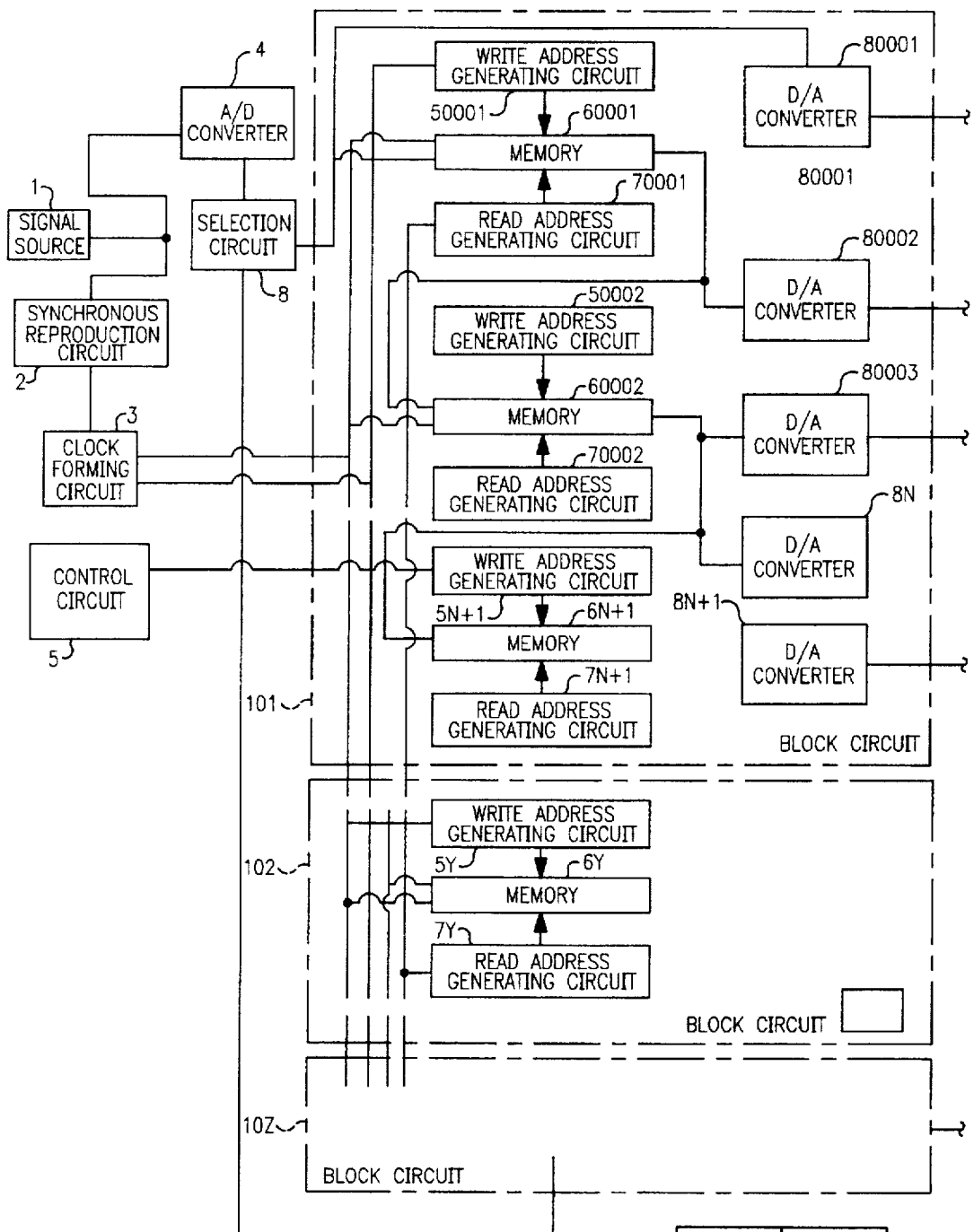
FIG. 3 is a block diagram showing a signal distribution apparatus of a second embodiment of the invention.
Figure 3B:
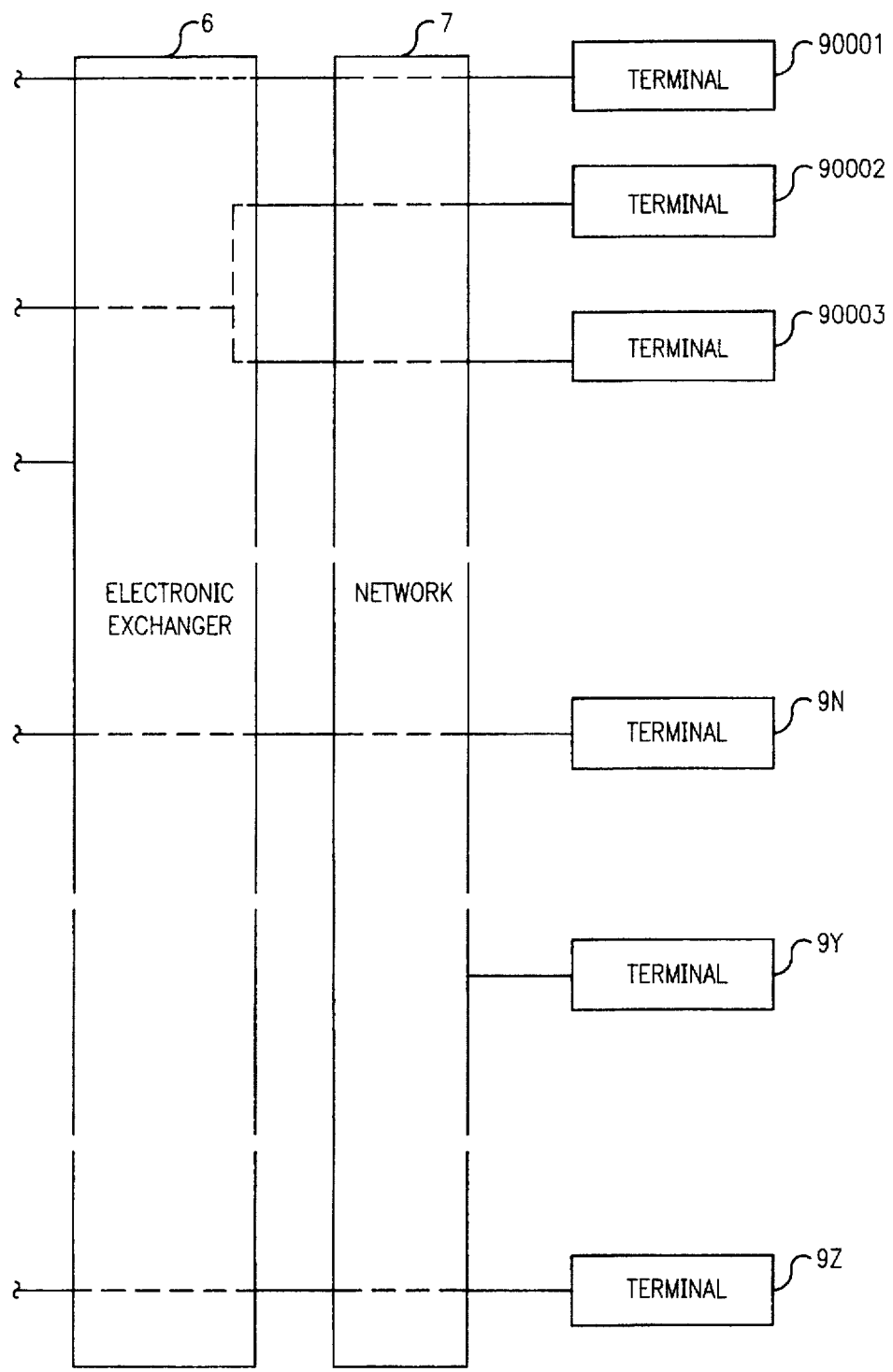

The invention of the first embodiment can be applied to a signal (movie) of less than 60 minutes. Since there are many movies more than one hour, an embodiment for movies more than two hours will be described with reference to FIG. 3. In FIG. 3, numeral 101 is a block including 50001–5Z, 60001–6Z, 70001–7Z, 80001–8Z+1 in FIG. 1. Numeral 102 has the same structure as in 101. For a movie of more than k hours, K+1 pieces of the same structural circuits as 101 are needed. Whenever a subscriber request a movie to be sent, the subscriber can always see a movie from the beginning by connecting the subscriber and the D/A converter from which the first one second of the signal is going to be output at the next moment among the D/A converters 101–10Z in FIG. 3. Once the subscriber and the DA converter are connected, there is no need to change the connection until the movie ends.

In the above illustration, the case when K=3 (just 3 hours) is described here. Electronic exchanger 6 in FIG. 3 connects any D/A converters, among the 3×3600=10800 D/A converters to an arbitrary terminal. To perform these connections using a one step electronic exchanger is generally hard. An electronic exchanger of two steps or more than two steps is recommended.

Since write control circuit 5 can control which part of the memory the first one second signal is stored, when the signal is requested from a terminal, it is easy to send the signal from the signal beginning to the terminal. When the capacity (time) of the memory 6N is one second, as described above, the signal can be supplied from the first one second, within 51/100 to 150/100 seconds after the request, to the requesting terminal. When the capacity of memory 6N is large enough to store an n second (n<10) signal, there occurs a maximum delay of (n+50/100) second, but the delay of approximately 10 seconds is tolerable.

EMBODIMENT 3

There are various lengths (times) of movies. FIG. 1 is applicable in the case where a movie is shorter than one hour. FIG. 3 is applicable when the movie is more than K hours long. In FIG. 1 (and in FIG. 3), when no signal or a predetermined signal indicating the end is detected in the output from the signal source 1, a no signal mark (generally a black level signal) is written in memories (60001–6Z) for up to one hour (integral multiples of one hour in FIG. 3) by the control of a write control circuit. A circuit for realizing the writing of the no mark signal is shown in FIG. 4.

Figure 4:
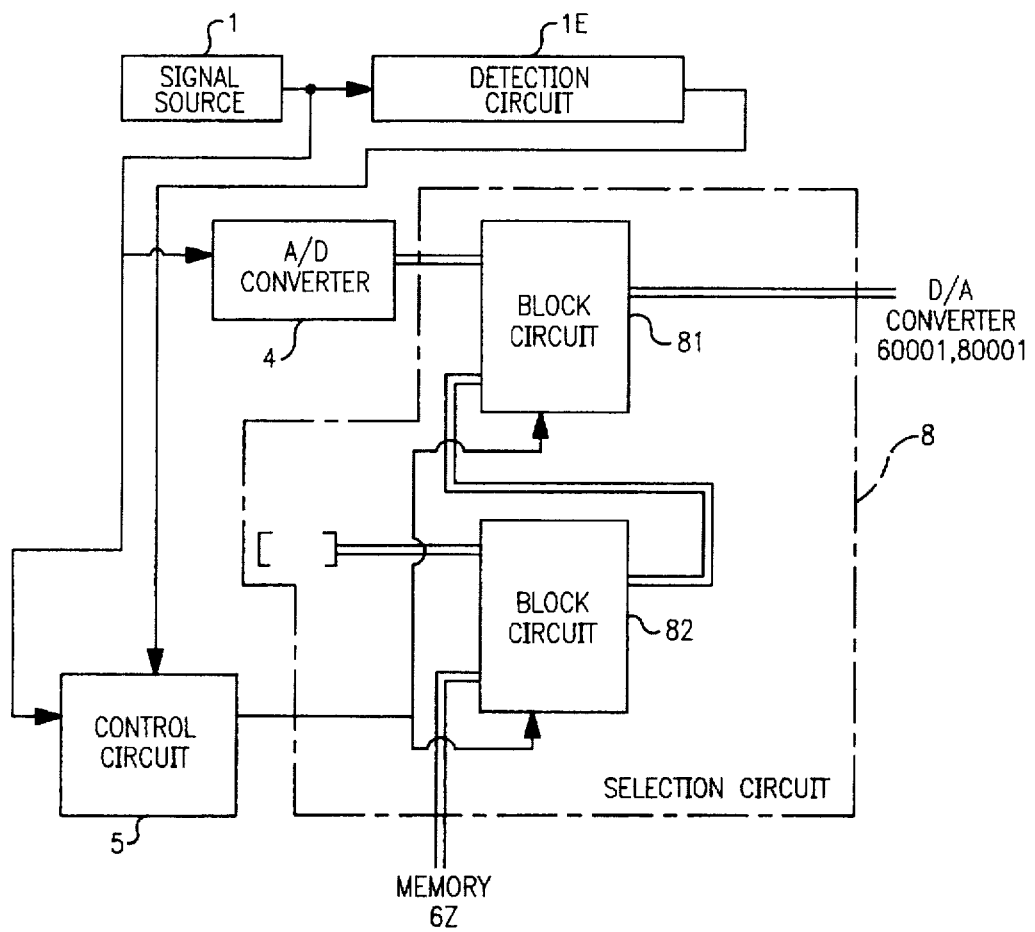
FIG. 4 is a partial block diagram showing a signal distribution apparatus of a third embodiment of the invention.

In FIG. 4, 1E is a detection circuit for detecting the end of a movie. When a specific end code is sent from signal source 1, the code is detected. Similarly, the detection circuit 1E detects the start signal.

Figure 5:
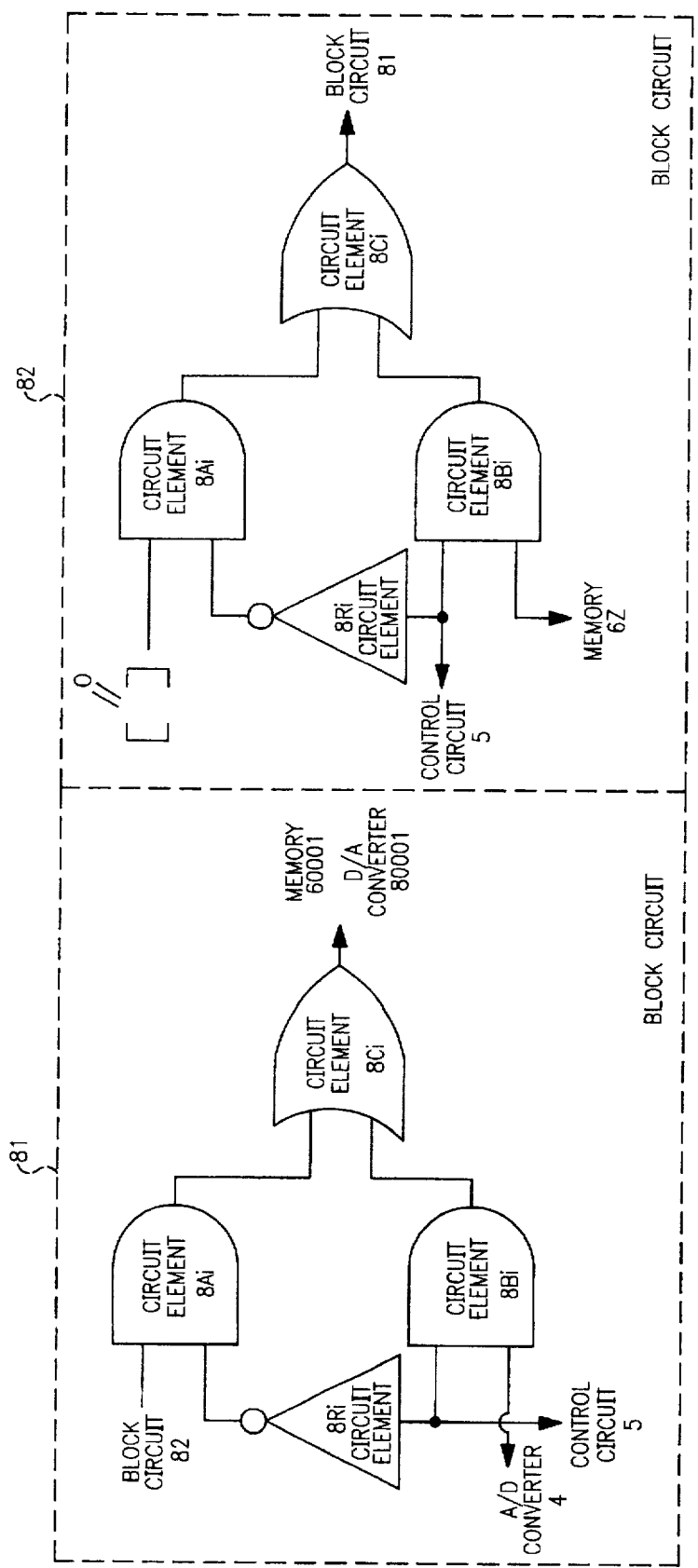
FIG. 5 is a circuit diagram of AND/OR gates of the apparatus.

When a control signal having a high level is output from write control circuit 5 from the start signal to the end signal, gate 8Bi in [the circuits 81, and 82 shown in FIG. 5 is enabled. By connecting the output of A/D converter 4 to one of the inputs of gate 8Bi of circuit 81, the output of A/D converter 4 is transmitted to memory 60001 and D/A converter 80001. On the other hand, since one of the inputs of gate 8Ai of circuit 81 is connected to the output of circuit 82, the output of the write control circuit 5 becomes a low level when the movie signal ends, and gate 8Ai is enabled, and gate 8Bi is cut-off. The output of gate 8Ci of circuit 82 is transmitted to memory 60001 and DA converter 80001. Since gate 8Ai of circuit 82 is connected, the output of gate 8Ai becomes a black level, namely 0.

The output of gate 8Ci thus becomes 0. At this moment, since gate 8Bi of circuit 82 is being cut-off, 0 is stored in the memory while the output of write control circuit 5 is a low level. At the A/D converter, white is converted to all 1's, (8 bits), and black is converted to all 0's (8 bits). When the write control circuit 5 counts one hour (or an integral multiple of one hour) and memory 6Z outputs the first part of the movie, gate 8Bi of circuit 82 has to be enabled and gate 8Ai has to be cut-off. When the start and end signals are detected and only during the interval between them, terminals and D/A converters 80001, 80002, . . . . . 8N are connected, gates 8Ai and 8Bi of circuit 81 operate as described above, and circuit 82 can be eliminated. In this case, noise (0 or 1) is randomly written in the memory. Since this is not transmitted to the terminals, it doesn't matter what is written in the memory.

EMBODIMENT 4

Figure 6B:
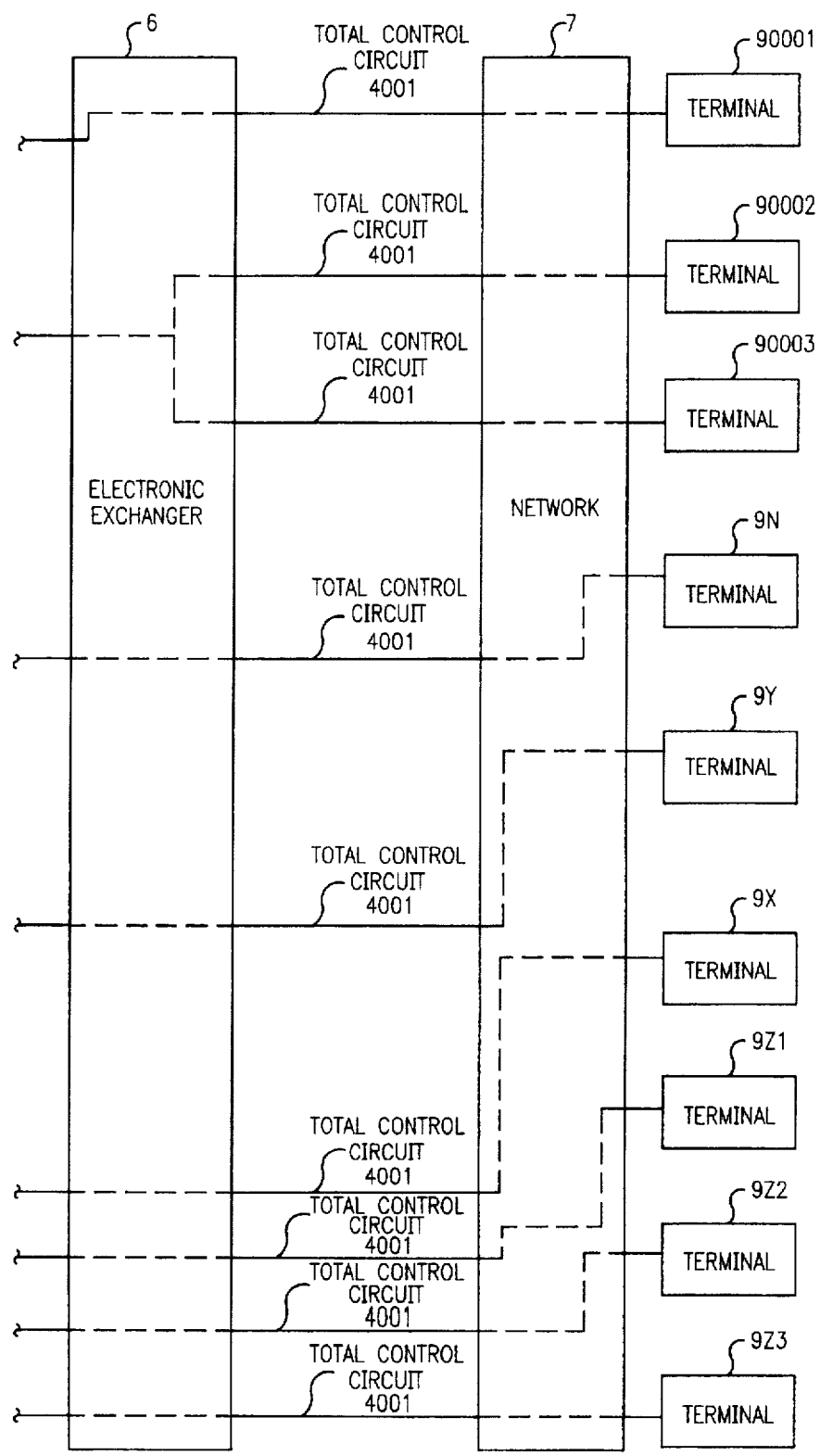
FIG. 6 is a block diagram showing a signal distribution apparatus of a fourth embodiment of the invention.

A system including a plurality of signal sources and a plurality of terminals is described below with reference to FIG. 6. In FIG. 6, 101 is the same as 101 in FIG. 3, 102 is the same as 102 in FIG. 3, and 10Z is the same as 10Z in FIG. 3. Numeral 3001 includes elements 101, 102 and 10Z and forms a memory circuit group for storing a K hour signal (movie). Numeral 3002 has the same structure as memory circuit group 3001. It is not necessary that memory circuit group 3001 and memory circuit group 3002 be the same size (memory capacity). Signal source 1001 is equivalent to the signal sources 1 in FIG. 1 and FIG. 3. Signal sources 1001, 1002A, 1002B (1002A and 1002B have the same contents), 1003 etc., are signal sources having different contents respectively. Their circuit structures are the same, but their recording media (VTR tape, or disk such as laser disks) are different.

Numeral 2001 includes a synchronous reproduction circuit 2, a clock generating circuit 3, an A/D converter 4, a write control circuit 5, and a selection circuit 8 as shown in FIG. 3. Numerals 2002, 2002A, etc. have the same structure as numeral 2001. FIG. 6 shows the connections in the case when there is a send request for signal sources 1001 from terminal 9Y and from terminals 90001, 90002, 90003, and 9N, and there are also send requests for signal source 1002 from subscribers 9X, 9Z1, and 9Z2 at different times, and a send request for signal source 1003 from subscriber 9Z3. The circuitry in FIG. 5, up to terminal 9Y, is the same as in FIG. 3. When there is no send request for signal source 1002 except from terminal 9X, the output of signal source 1002 can be fed directly to terminal 9X, so the connection is simple. The case where, after 4 minutes, 45 seconds, the send requests from terminals 9Z1 and 9Z2 are sent is described below. Since signal outputting of the signal source 1002A has occurred for 4 minutes, 45 seconds, from initial sending to terminal 9X, the entire signal of signal source 1002A cannot be sent from the signal source 1002A to terminal 9Z1. Accordingly, when an economical system structure including accident counter plan is considered, all signal sources should have the same signal source. For the first send request, the signal is fed to a terminal without connecting to the memory circuit group. For the second send request, signal source 1002B which contains the same contents as signal source 1002A and memory circuit group 3002 are connected, and the contents of the signal source 1002B is output from the beginning. When memory circuit group 3002 is connected and there is a send request for the 10002 signal from terminal 9Z2 at a later time, this can be accomplished by connecting terminal 9Z2 to an arbitrary point of memory circuit group 3002 (the output of a D/A converter connected with the output of the memory circuit from which the first one second signal of the signal source 1002B signal is to be read out next). As long as the whole system operation is controlled, it is easy to discriminate signal sources having many send requests and few send requests. In FIG. 6, for example, a total control circuit 4001 including a work station is provided. The total control circuit 4001 classifies send requests from subscribers and compares them with recent send request examples. When a plurality of send requests are predicted, a memory circuit group is connected between the signal source and the terminal even if there is only one send request at the moment.

In FIG. 6, memory circuit groups 3001, 3002, . . . are combined in one block. Blocks 101, 102, . . . , are memory circuits for storing, for example, a one hour signal, the number of memory circuits for one hour included in memory circuit groups 3001, 3002, . . . , having a long time capacity can be changed according to the lengths of the signals stored in the signal sources 1001, 1002, . . . Thereby, the number of memory circuit groups 3001, 3002, . . . can be reduced, and the total memory capacity may become smaller.

EMBODIMENT 5

Figure 7A:
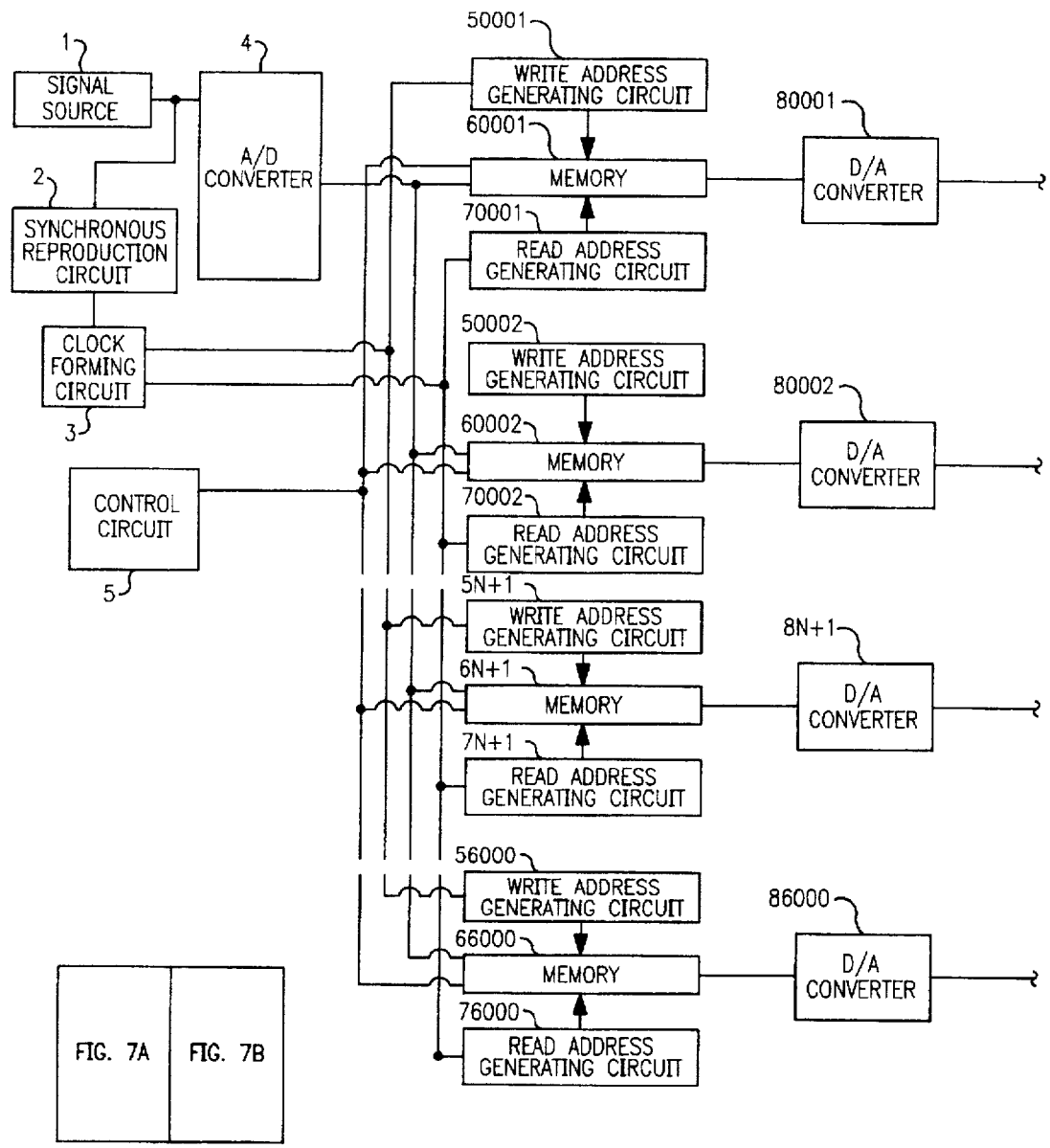
FIG. 7 is a block diagram showing a signal distribution apparatus of a fifth embodiment of the invention.
Figure 7B:
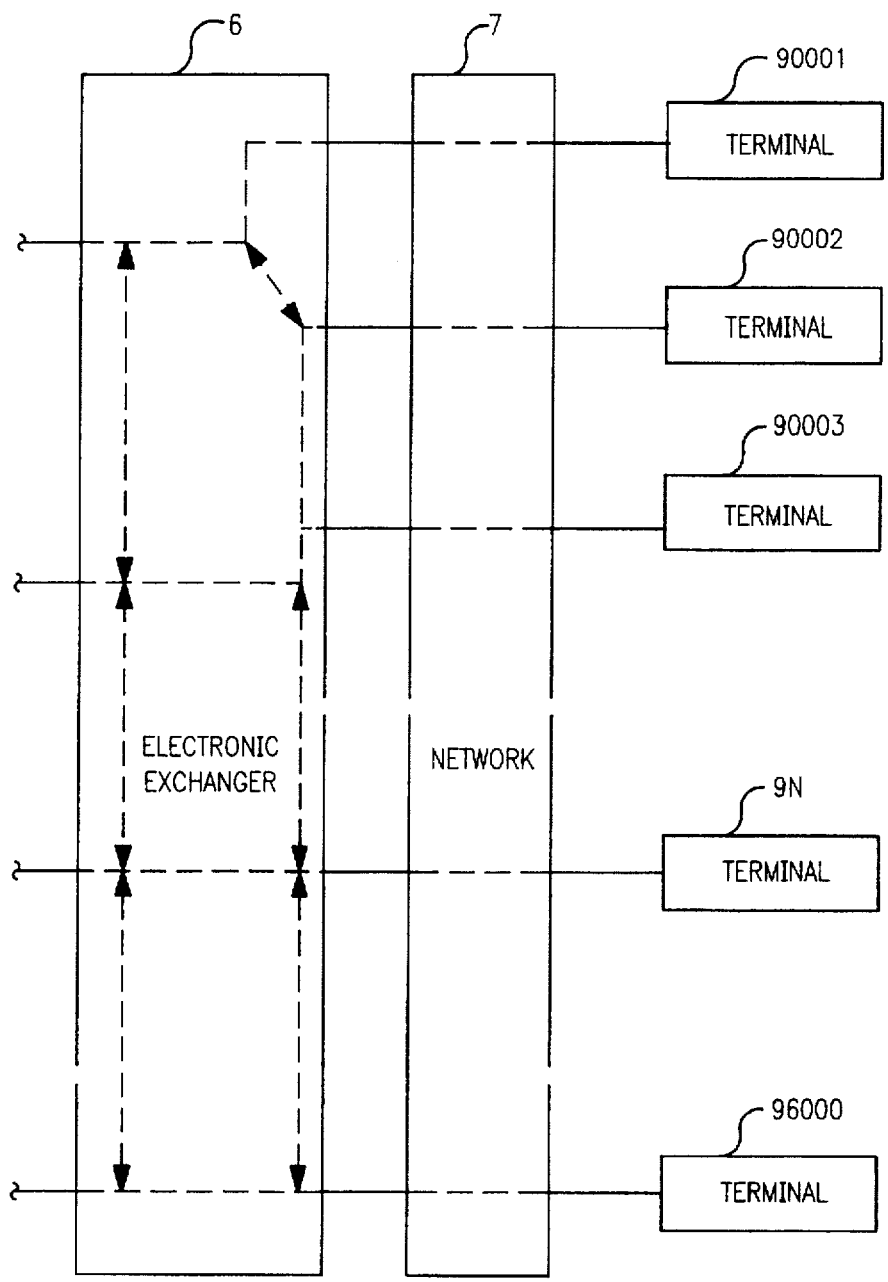

In FIG. 7, the differences between this embodiment and FIG. 1 (embodiment) 1 are that A/D converter 4 is directly connected to memories 60001, 60002, . . . 66000 without passing through a selection circuit, and the 8-bit output of the AD converter is fed in parallel to memories 60001, 60002, . . . 66000. Accordingly, the connection of the D/A converters 80001, . . . 86000 and the operation of electronic exchanger 6 are different, but the other parts are the same as in FIG. 1, and the description of similar components is omitted.

The operation of the system shown in FIG. 7 when VOD is performed is described below. First, there is a send request from subscriber 1 (terminal 90001) at time t. The reproduction by the laser disk of signal source 1 starts at time t. Here the delay between the request and the start is omitted to simplify the description of the invention since the delay is not relevant to the spirit of the invention. A first one second video signal is stored in memory 60001. At the same time, the signal is read out from the memory to transmit the video signal output from signal source 1 to terminal 90001 from time t. During the interval from time t+1 second to t+2 seconds, the video signal output from signal source 1 is stored in memory 60002. At this moment, electronic exchanger 6 changes over so that the output of 80002 is fed to terminal 90001. Electronic exchanger 6 provides a continuous signal by switching the D/A converterconnected to terminal 90001 every one second.

Reading out from memories 60001, 60002, . . . can be performed at the timing of one second units if writing to memories 50001, 60002, . . . is performed at the same timing of one second units. In addition, memories 60001, 60002, . . . . can be read out by a common timing.

Till 60 min 00 sec, the outputs of D/A converters 80001, 80002, . . . . . 86000 are successively changed over by electronic exchanger 6 to transmit to subscriber 90001. From 59 minutes 59 seconds to 60 minutes 00 seconds, the output of D/A converter 86000 is transmitted to terminal 90001. In this manner, a movie of 60 minutes can be transmitted to terminal 90001. That is, the electronic exchanger connects (changes over) terminal 90001 to D/A converters in the order of 80001, 80002, . . . . . 8N.

Next, the following case where the same signal that (movie) was requested from terminal 90001 is requested from two terminals at the same time is described. The requested time is assumed to be t+02 seconds. The video signal between time t+00 seconds and t+01 second is stored in memory 60001, the video signal between time t+01 second and t+02 second is stored in memory 60002, and the video signal between time t+02 seconds and t+03 seconds is stored in memory 60003. Accordingly, the output of memory 60001 is transmitted to terminals 90002 and 90003 in between time t+02 seconds and time t+03 seconds. That is, the same movie that is fed to terminal 90001 is fed to terminals 90002 and 90003 after a delay of 2 seconds. Successively, the memory contents are transmitted in the order of memories 60002, 6002, ... to terminals 90002 and 90003 at the same time. That is, the movie of 60 minutes is transmitted to terminals 90002 and 90003 after a delay of 2 seconds from the movie fed to terminal 90001. The electronic exchanger connects (changes over) terminals 90002 and 90003 to D/A converter groups in the order of 80001, 80002, ... 8N (N–6000). This action is the identical to the case of feeding a movie signal to terminal 90001. An existing electronic exchanger can be easily configured so that the output of a D/A converter group can be simultaneously supplied to two terminals or more. This circuit configuration is capable of supplying a movie to many terminals at the same time or at different times.

That is, when subscriber N requests the same signal (movie) as supplied to terminal 90001 at an arbitrary time t+N, different time from the request time of terminal 90001, (assume N is 28 minutes 11 seconds). The contents of memory 6N+1 are transmitted to the terminal 90001 at that time.

Assuming N is 28 minutes 11 seconds, then N+1=2812. The contents of memory 62812 are transmitted to terminal 90001 at this moment. By transmitting the contents of memory 60001 to terminal 9N, the movie signal delayed 28 minutes, 11 seconds can be transmitted to terminal 9N. Multiple subscribers can request the delayed signal.

Assume there is a request from subscriber Z just 60 min after subscriber 90001 has just finished watching the one hour movie. That is, the contents of memory 66000 have just been transmitted to 90001. Accordingly, the contents of memory 60001 are transmitted to terminal 9Z from time t+60 min 00 sec. Namely, the signal is transmitted to terminal 9Z delayed by 60 min.

In the embodiment described above, one signal source can accommodate the requests for the same signal from a plurality of terminals at arbitrary times.

EMBODIMENT 6

Figures 8, 8A:
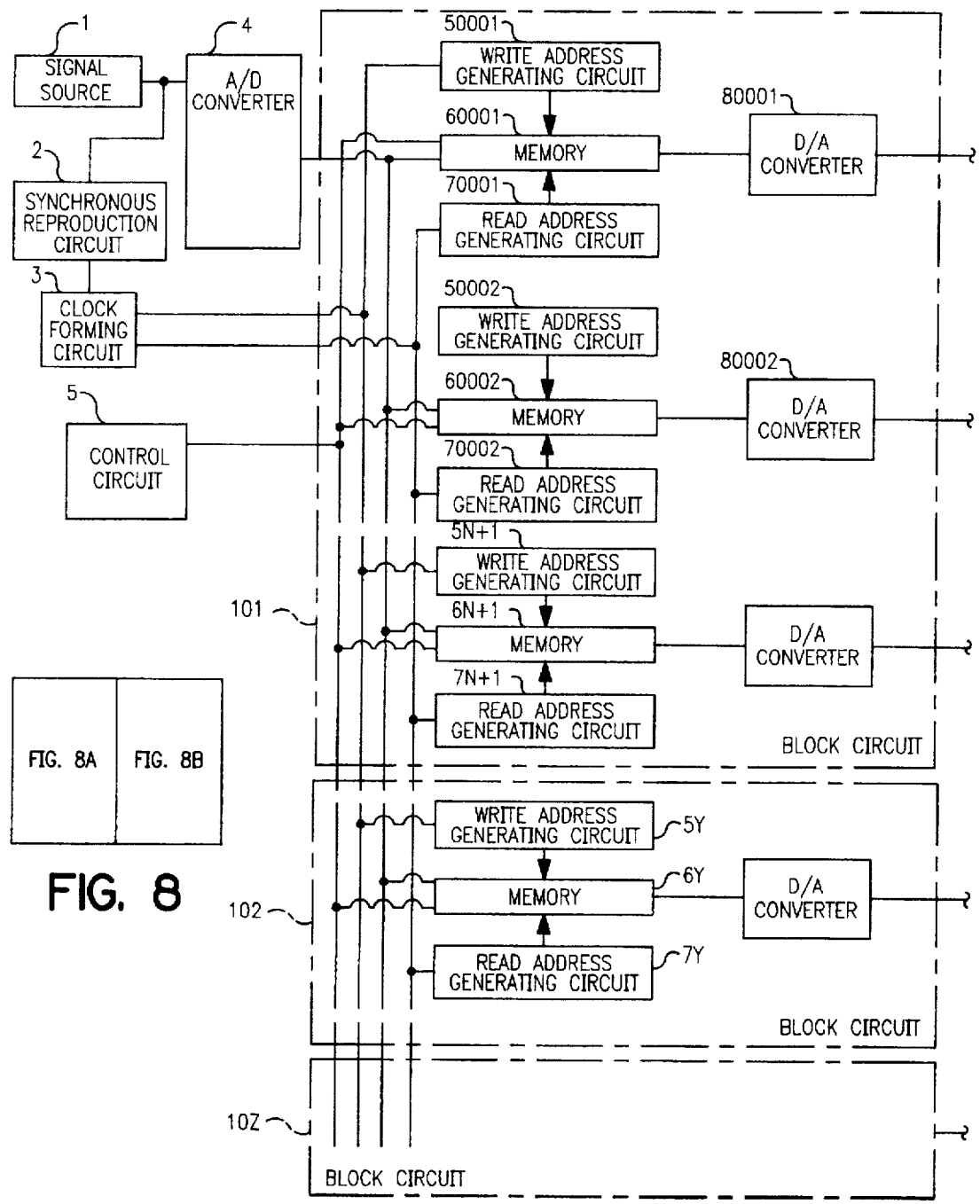
FIG. 8 is a block diagram showing a sixth embodiment in which a signal more than two hours is distributed by the apparatus above.
Figure 8B:
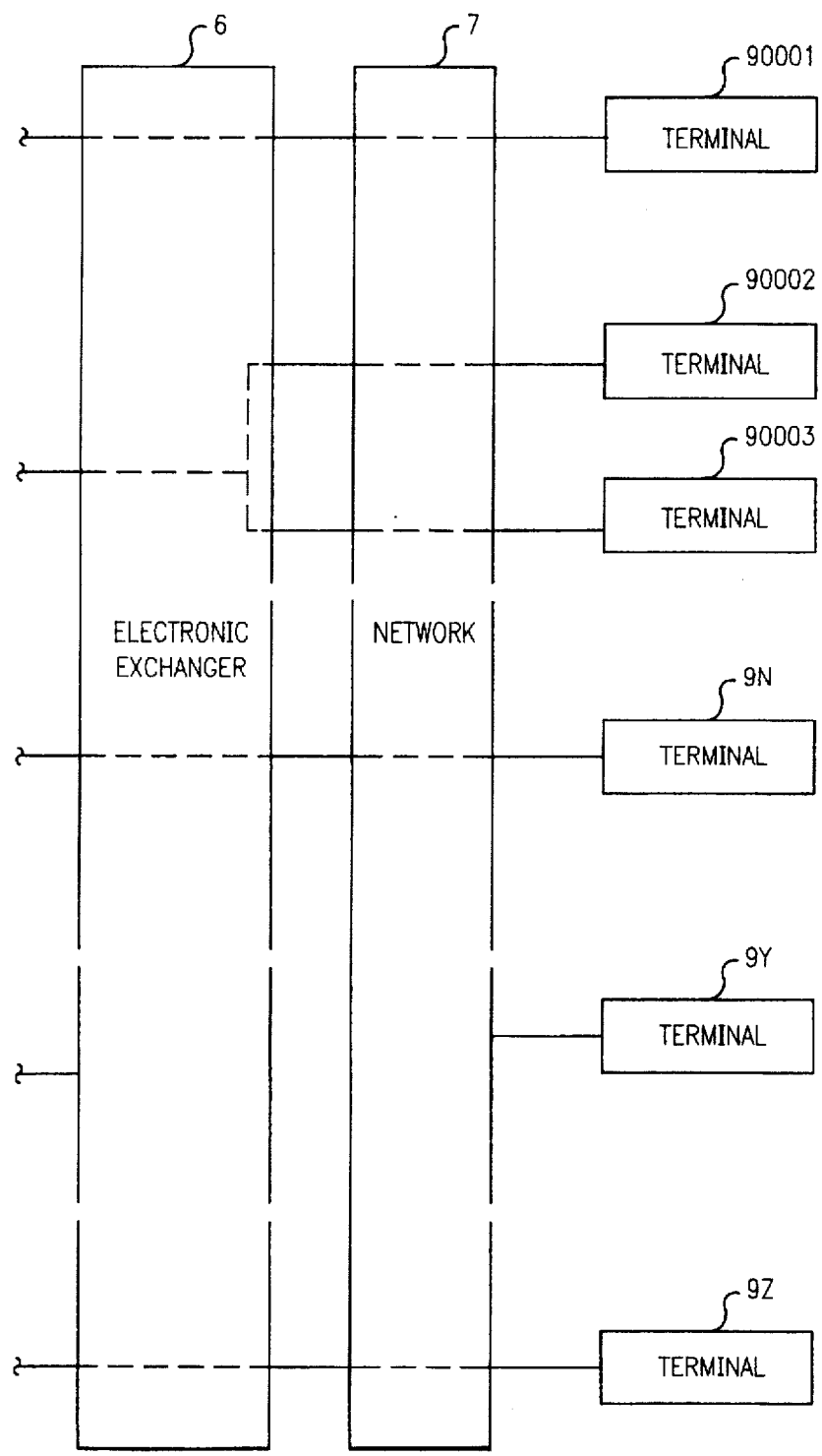

The above described embodiment is used with a signal (movie) of less than 60 minutes, however, there are many movies more than one hour. The present embodiment, which can provide a movie more than two hours long will be described with reference to FIG. 8. In FIG. 8, numeral 101 is a block including 50001–5Z, 60001–6Z, 70001–7Z, and 80001–8Z of FIG. 7. Numeral 102 has the same constitution as numeral 101. The remainder of the circuitry is the same as FIG. 7 up to block 10Z. In this embodiment, a movie of more than K hours can be accommodated by using K+1 of the same circuits as 101. Whenever a subscriber's request is received, the subscriber can see a movie from the beginning by connecting the subscriber to the D/A converter groups successively from 80001 of 101 in FIG. 8.

According to the illustration above, it K=3 (just 3 hours), electronic exchanger 6 in FIG. 8 has to connect D/A converter groups numbering 3×3600, or 10800, one step electronic converters generally cannot do that, and thus more than two steps is recommended.

EMBODIMENT 7

Figure 9:
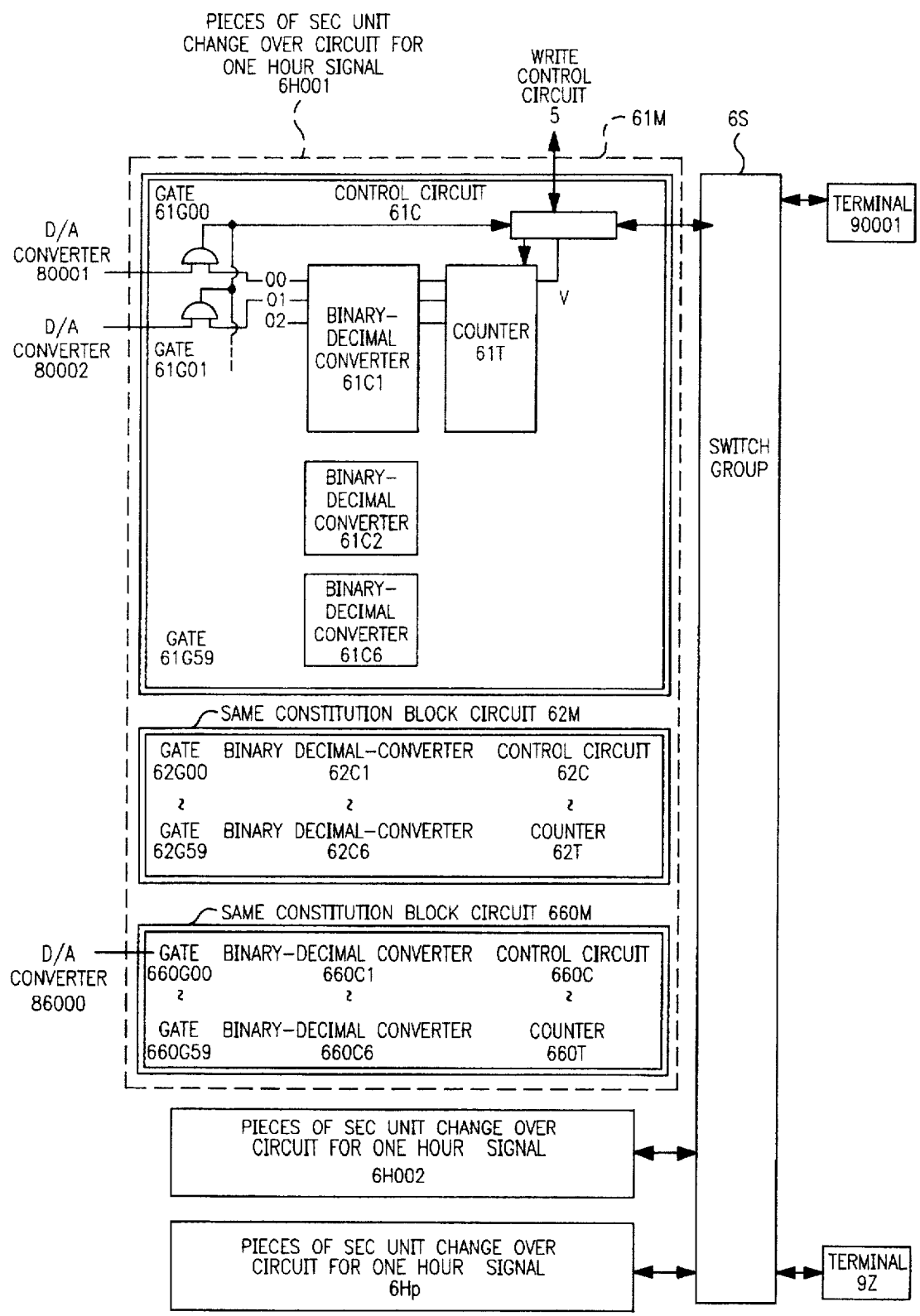
FIG. 9 is a block diagram of a signal change over circuit provided at the front stage of a switch group of an electronic exchanger in a seventh embodiment of the invention.

Circuitry for changing over D/A converters every second can be formed on a large scale integrated (LSI). An exampleis shown in FIG. 9. In FIG. 9, 6S is a switch group and 6H001, 6H002, ..., 6Hp are p one second unit change over circuits for a one hour signal. When a send request comes from terminal 90001 at time t, switch 6S selects and connects a one second unit change over circuits for one hour signal which is not connected to terminal 90001 and switch 6S among the one second unit changer over circuits for one hour signal 6H001, 6H002, ..., 6Hp. Assuming that they are selected in the order of 6H001, 6H002, ..., and that terminal 90001 requested a signal first, the request signal from terminal 90001 is transmitted to 61 M, and control circuit 61C detects the request contents (title of the movie). Signal source 1 in FIG. 1 storing the desired movie is then selected. Write control circuit is checked, and if there is no signal reading from the signal source in FIG. 7, write control circuit 5 controls so that the signal of signal source 1 is written to and read from memories 60001, 60002, ..., successively. As the reading is performed during writing at first, a small delay with respect to the request of terminal 90001 may occur at the start even if the connecting time of a telephone network is neglected. But as described before, the delay is neglected here since the delay doesn't affect the description of the operating principle of the invention.

Gate 61G00 is opened in synchronization with the output of D/A converter 80001. Counter 61T is a synchronizing type binary counter and counts vertical synchronizing pulses of the output of synchronous reproduction circuit 2 in FIG. 7. The vertical synchronizing pulse is divided by sixty so that the output of 61T changes one bit per second. 61C1 is a binary-decimal converter for decoding the output of counter 61T and its output is connected to gates 61G00, 61G01, ..., respectively as shown in FIG. 9. Gate 61G00 is opened from 00 seconds to 01 seconds and gate 61G01 is opened from 01 second to 02 seconds. Successively, gates from 61G00 to 61G 59 are opened during first one minutes. The outputs of the D/A converters from 80001 to 80060 are transmitted to terminal 90001 through gates from 61G00 to 61G59. The outputs of the gates from 61G00 to 61G59 are formed a wired or gate. During the next one minute, gates from 62G00 to 62G59 in 62M are successively opened, and the outputs of the D/A converters from 80101 to 80160 are transmitted to terminal 90001. As described above, 61M and 62 M have the same configuration, which continues up to 660M. The Group including from 61 M to 660M is denoted at 6H001. Group 6H001 transmits the outputs of the D/A converters from 80001 to 86000 (one hour signal) successively to terminals 90001, so terminal 90001 receives a movie of one hour. Signal switch 6S connects terminal 90001 to 61M, 62M, and 660M successively.

The above described group 6H001 provides about a one hour movie. Movies of more than two hours can also be transmitted by connecting one second unit change over circuits for one hour 6H002, 6H003, ..., which have the same configuration as group 6H001, to D/A converter groups to transmit the signal to terminal 90001. By using the one second unit change over circuits for one hour, 6HXXX, 6HXXX+1, ... a movie of one hour or more can be sent in the same manner as to terminal 90001, to multiple terminals and each of the terminals can request and receive a signal independently. To accommodate many terminals, switch group 65, which is the same as in FIG. 9, and a one second unit change over circuit 6HYYY for one hour signal are prepared.

In the present embodiment, when a movie is requested from a plurality of terminals at different times, the movie signal can be sent from a signal source according to required timings. Counter 61T is reset when a send request comes from a terminal. Counter 62T starts counting vertical synchronizing pulses after counter 61T finished counting for one minute, and counter 63T starts counting the vertical synchronizing pulses after counter 62T finished counting for one minute. It is easy to constitute the above].

Since blocks 61M, 62M, . . . 660M have the same circuitry and all are digital circuits, they can be formed on an integrated circuit (IC). Block 6H001 can be formed in one LSI. Switch 6S can be a conventional electronic exchanger.

EMBODIMENT 8

The embodiment described above shows that the invention can correspond to the requests for a signal source from a plurality of terminals.

Figure 10:
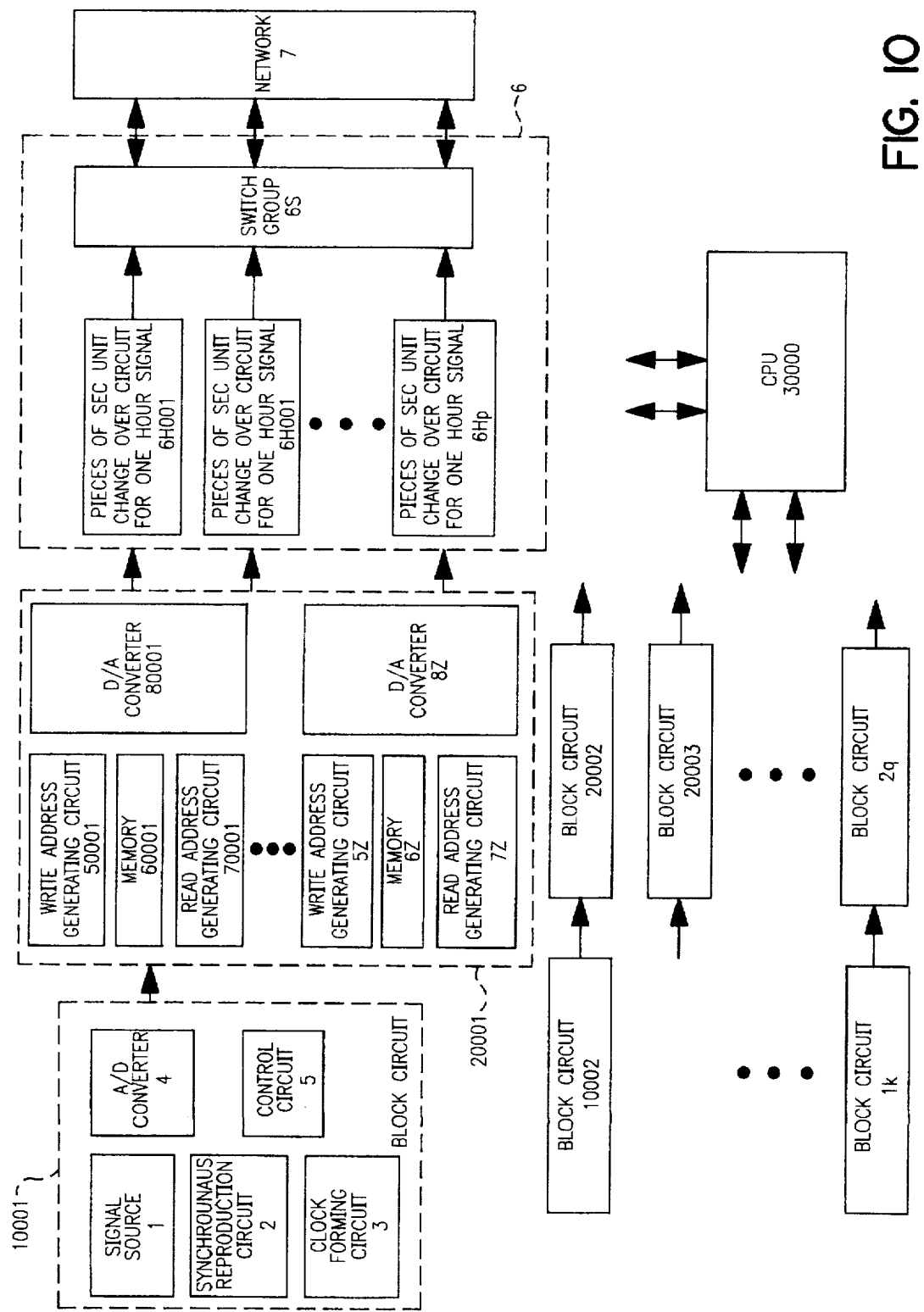
FIG. 10 is a block diagram of a signal distribution apparatus between a plurality of signal sources and a plurality of terminals in an eighth embodiment of the invention.
Figure 11:
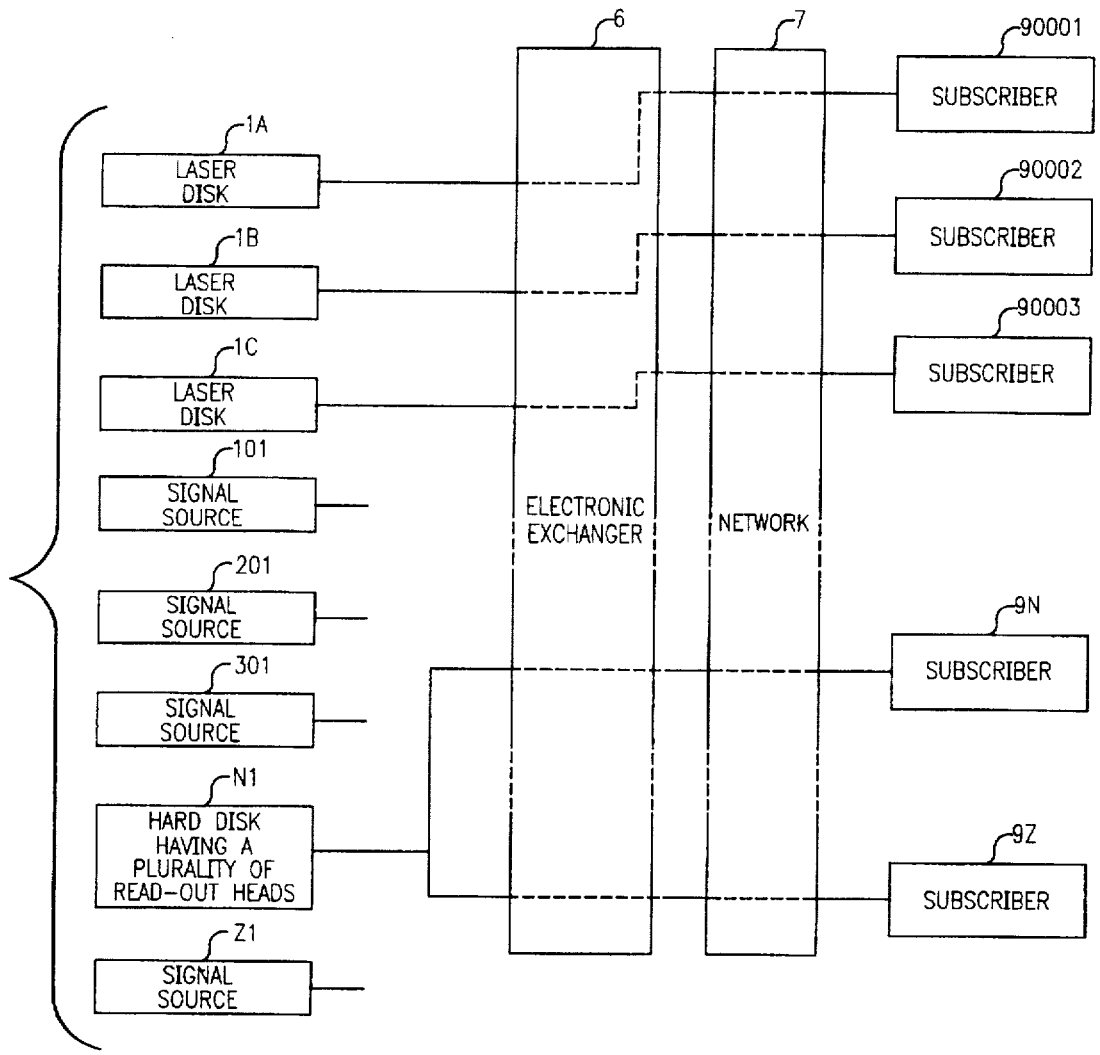
FIG. 11 is a block diagram of a conventional signal distribution apparatus.

Next, the case in which requests for a plurality of signal sources comes from a plurality of terminals is described with reference to FIG. 10. In FIG. 10, 10001 is a block including 1, 2, 3, 4, and 5 in FIG. 7, and 10002, . . . , 1K have the same constitution. Block 20001 is a block including 50001–5Z, 60001–6Z, 70001–7Z, and 80001–8Z. Block 20001 can accommodate a one hour signal. Blocks 20002, 20003, . . . , 2q can also accommodate a one hour signal, respectively. Requests from terminals are detected by CPU 30000 (work station or high level computer). The detection is performed by getting information from control circuit 61C in FIG. 9. The length of the required signal (movie) can be determined by investigating the contents of signal source 1 in 10001, 10002, . . . , 1K. Control CPU 30000 selects one of the signal sources 10001, 10002, . . . , 1K. According to the length (time) of the signal, the number of blocks 20001, 20002, etc. to be connected to the signal sources is decided. According to the number of blocks 20001, 20002, etc., blocks 6H001, 6H002, etc. are connected. Control CPU 30000 needn't correspond to requests for the same signal from multiple terminals (as described above) though, the control CPU can accommodate that situation.

A signal distribution apparatus according to the present invention can accommodate requests for the same signal from a plurality of terminals at the same time or different times by providing a plurality of unit memory devices for storing the output of a signal source. By allotting divided intervals of fixed time length of the output of the signal source to each of the unit memory means, a second signal source is formed without increasing the number of signal sources. The present invention is mainly constituted of digital circuits, and thus it may be formed on an LSI circuit. This simplifies the total structure.

What is claimed:

1. A signal distribution apparatus comprising:
   a plurality of signal sources for generating signals having contents that change with time and having lengths that are different from each other;
   a plurality of unit memory circuits U for storing a specific time period of the output of said signal sources;
   a memory circuit group A formed by connecting said plurality of unit memory circuits U serially; and,
   an electronic exchanger for sending the output of an arbitrary unit memory circuit Un in said memory circuit group A to a plurality of terminal receivers.

2. The signal distribution apparatus of claim 1, further comprising:
   a plurality of memory circuit groups A connected serially.

3. The signal distribution apparatus of claim 1, further comprising:
   a plurality of memory circuit groups A having a plurality of unit memory circuits Ui connected serially; and,
   a control circuit for connecting a plurality of said memory circuit groups A serially when z>q so that the memory time becomes longer than zT sec,
   here, qT sec is the capacity of one memory circuit group A, zT sec is the length of the signal supplied from a signal source.

4. The signal distribution apparatus of claim 1, further comprising:
   a plurality of memory circuit groups A; and,
   a judging means for judging frequently used signal sources among said plurality of signal sources;
   wherein, the signal sources judged as frequently used are preferentially connected to a part of said plurality of memory circuit groups A.

5. The signal distribution apparatus of claim 1, wherein said plurality of unit memory circuits include the same components.

6. The signal distribution apparatus of claim 1, further comprising:
   a read out control circuit for,
   writing the first T seconds of a signal time serially output from said signal source from a time t0 in a first unit memory circuit U1,
   during a next interval from t0+T seconds to t0+2T seconds, reading the first T second signal from said first unit memory circuit U1 and writing the first T second signal to a second unit memory circuit U2 and, at the same time, writing the signal from said signal source into said first unit memory circuit U1 after the first T second signal is read,
   during a next interval from t0+2T seconds to t0+3T seconds, reading the second T second signal from said first unit memory circuit U1 and writing the second T second signal to a second unit memory circuit U2 and, at the same time, writing the signal from said signal source in said first unit memory circuit U1 after the second T second signal is read, and, at the same time, reading the first T second signal from said second unit memory circuit U2 and writing the first T second signal in a third unit memory circuit U3, and continuing the reading and writing until the signal from the signal source is written in each of the unit memory circuits Ui,
   wherein, said electronic exchanger reads out the signals from the unit memory circuits U simultaneously and supplies the signal input to the first unit memory circuit U1 or a signal having the same delay, to a first terminal receiver that requests a signal from said signal source,
   said electronic exchanger supplies the output signal of unit memory circuit Uk+1 to the Nth terminal requesting the signal of the signal source from the beginning at the time delayed by Y seconds from the request time of the first terminal.

7. The signal distribution apparatus of claim 6, wherein the first part of the output of the signal source is supplied from time Y+p seconds, where Y>>p, to terminal N requesting the signal at a time delayed by Y seconds from the request time of the first terminal after the request by the Nth terminal Y seconds after the request by the first terminal, and connects the signal from the signal source delayed by Y seconds to said Nth terminal.

8. The signal distribution apparatus of claim 6, wherein, wherein the length of the signal from the signal source is GT seconds and when X>G, lack of signal data is stored in the unit memory circuits in the memory circuit groups A for (XT−GT) seconds.

9. The signal distribution apparatus of claim 8, further comprising:

detecting means for detecting an end signal of the signal from the signal source of time length GT; wherein after the end signal is detected, lack of signal data is stored in the unit memory circuits in memory circuit groups A.

10. The signal distribution apparatus of claim 6, further comprising:

a control circuit provided between said electronic exchanger and said signal source for managing which unit memory circuit is outputting the beginning of the video signal of said signal source, and, wherein said electronic exchanger supplies the beginning of the video signal of said signal source immediately or just memory circuit groups A so as to supply the requested signals from the beginning with a delay from the request time for the signal.

11. The signal distribution apparatus of claim 1, further comprising:

a plurality of signal sources;

a plurality of memory circuit groups A composed of a plurality of said unit memory circuits U serially connected;

a control computer for sending a signal corresponding to the requests from terminals when send requests for the same signal at different times are received from a plurality of terminals under the condition of N>X, where N is the number of said signal sources, and X is the number of said memory circuit groups A, and for combining a plurality of memory circuit groups A to send the signal corresponding to the requests when the length of the signal of the signal source is longer than the memory capacity of a memory circuit group A; and, a switch group for serially connecting a number of said memory circuit groups A corresponding to the length of the source signal when a plurality of signal sources are requested from different terminal groups at the same time or at different times, and for connecting the electronic exchanger, signal sources, and memory circuit groups A so as to supply the requested signals from the beginning with a delay from the request time for the signal.

12. A signal distribution apparatus comprising:

a first signal source for generating a time serial signal;

a plurality of unit memory circuits for storing the output of said first signal source by time serially allotting divided intervals of the output a of said first signal source to each of the plurality of unit memory circuits;

a second signal source formed by connecting said plurality of unit memory circuits; and, an electronic exchanger for sending the output of an arbitrary unit memory circuit in said second signal source to a plurality of terminal receivers;

wherein said time serial signal is read from said second signal source and distributed by said electronic exchanger.

13. The signal distribution apparatus of claim 12, wherein said plurality of unit memory circuits include the same components.

14. The signal distribution apparatus of claim 12, further comprising:

a read out control circuit for, writing the first T seconds of a signal time serially output from said signal source from a time t0 in a first unit memory circuit U1, during a next interval from t0+T seconds to t0+2T seconds, reading the first T second signal from said first unit memory circuit U1 and writing the first T second signal to a second unit memory circuit U2 and, at the same time, writing the signal from said signal source into said first unit memory circuit U1 after the first T second signal is read, during a next interval from t0+2T seconds to t0+3T seconds, reading the second T second signal from said first unit memory circuit U1 and writing the second T second signal to a second unit memory circuit U2 and, at the same time, writing the signal from said signal source in said first unit memory circuit U1 after the second T second signal is read out, and, at the same time, reading the first T second signal from said second unit memory circuit U2 and writing the first T second signal in a third unit memory circuit U3, and continuing the reading and writing until the signal from the signal source is written in each of the unit memory circuits Ui, wherein, said electronic exchanger reads the signals from the unit memory circuits U simultaneously and supplies the signal input to the first unit memory circuit U1 or a signal having the same delay, to a first terminal receiver that requests a signal from said signal source, said electronic exchanger supplies the output signal of unit memory circuit Uk+1 to the Nth terminal requesting the signal of the signal source from the beginning at the time delayed by Y seconds from the request time of the first terminal.

15. The signal distribution apparatus of claim 14, wherein the first part of the output of the signal source is supplied from time Y+p seconds, where Y>>p, to terminal N requesting the signal at a time delayed by Y seconds from the request time of the first terminal.

16. The signal distribution apparatus of claim 14, wherein the length of the signal from the signal source is GT seconds and when X>G, lack of signal data is stored in the unit memory circuits in the memory circuit groups A for (XT−GT) seconds.

17. The signal distribution apparatus of claim 16, further comprising:

detecting means for detecting an end signal of the signal from the signal source of time length GT; wherein after the end signal is detected, lack of signal data is stored in the unit memory circuits in memory circuit groups A.

18. The signal distribution apparatus of claim 14, further comprising:

a control circuit provided between said electronic exchanger and said signal source for managing which unit memory circuit is outputting the beginning of the video signal of said signal source, and, wherein said electronic exchanger supplies the beginning of the video signal of said signal source immediately or just after the request by the Nth terminal Y seconds after the request by the first terminal, and connects the signal from the signal source delayed by Y seconds to said Nth terminal.

19. The signal distribution apparatus of claim 12, wherein the time serial signal from the signal source is time serially divided and written into a plurality of said unit memory circuits in the order of first unit memory circuit to last unit memory circuit, said electronic exchanger supplies the memory contents of said plurality of unit memory circuits, in the order of first unit memory circuit to last unit memory circuit, to the first terminal receiver and the terminals requesting the time serial signal at the same time as the first terminal, said electronic exchanger also supplies the memory contents of said plurality of unit memory circuits, in the order of said first unit memory circuit to the last unit memory circuit, to the Nth terminal requesting the signal of the signal source from the beginning at a time delayed T seconds from the request by the first terminal.

20. The signal distribution apparatus of claim 12, further comprising:

a plurality of signal sources;

a plurality of memory circuit groups A composed of a plurality of said unit memory circuits U serially connected;

a control computer for sending a signal corresponding to the requests from terminals when send requests for the same signal at different times are received from a plurality of terminals under the condition of N>X, where N is the number of said signal sources, and X is the number of said memory circuit groups A, and for combining a plurality of memory circuit groups A to send the signal corresponding to the requests when the length of the signal of the signal source is longer than the memory capacity of a memory circuit group A; and, a switch group for serially connecting a number of said memory circuit groups A corresponding to the length of the source signal when a plurality of signal sources are requested from different terminal groups at the same time or at different times, and for connecting the electronic exchanger, signal sources, and of the unit memory circuit can be set at an arbitrary length].

21. A signal distribution apparatus comprising:

a signal source for generating a time serial signal whose contents change with time;

a plurality of unit memory circuits U for storing a time length T of the output of said signal source;

a delay means for delaying the signal by time TX by connecting X unit memory circuits U serially and transferring memory contents of each memory circuit to a successive memory circuit;

a plurality of delayed signal read out means for reading out the memory contents of the unit memory circuit U when requested and maintaining synchronization with the transferring of the signal by said delay means; and, an electronic exchanger for outputting the signal from said delay signal read out means.

* * * * *

UNITED STATES PATENT AND TRADE MARK OFFICE
CERTIFICATE OF CORRECTION

PATENT NO.   : 5,768,518
DATED        : June 16, 1998
INVENTOR(S)  : Hirashima

It is certified that error appears in the above-identified patent and that said Letters Patent is hereby corrected as shown below:

On the cover page, item [54] the title, delete "SIGNAL DISTRIBUTION APPARATUS FOR A DIRECTIONAL SIGNAL TRANSMISSION SYSTEM" and insert –SIGNAL DISTRIBUTION APPARATUS BY DIRECTIONAL SIGNAL TRANSMISSION SYSTEM--.

Column 13, lines 22-24, delete "memory circuit groups A so as to supply the requested signals from the beginning with a delay from the request time for the signal", and insert –after the request by the Nth terminal Y seconds after the request by the first terminal, and connects the signal from the signal source delayed by Y seconds to said Nth terminal.--

Column 13, line 55, delete "a".

Column 16, lines 11-12, delete "of the unit memory circuit can be set at an arbitrary length]" and insert –memory circuit groups A so as to supply the requested signals from the beginning with a delay from the request time for the signal--.

Signed and Sealed this

Eleventh Day of May, 1999

*Attest:*

Q. TODD DICKINSON

*Attesting Officer*   Acting Commissioner of Patents and Trademarks